United States Patent [19]
Kim

[11] Patent Number: 5,807,201
[45] Date of Patent: Sep. 15, 1998

[54] TRANSMISSION APPARATUS CAPABLE OF BEING DRIVEN IN TWO REVERSE SPEEDS

[75] Inventor: Ji-Hong Kim, Seoul, Rep. of Korea

[73] Assignee: Hyundai Motor Company, Ltd., Seoul, Rep. of Korea

[21] Appl. No.: 655,928

[22] Filed: May 31, 1996

[30] Foreign Application Priority Data

Jun. 1, 1995 [KR] Rep. of Korea ................... 1995 14529

[51] Int. Cl.⁶ .................................................. F16H 37/08
[52] U.S. Cl. .................. 475/203; 74/665 GA; 74/665 T
[58] Field of Search ...................................... 475/203, 198, 475/200, 206; 74/665 GA, 665 T, 339, 363

[56] References Cited

U.S. PATENT DOCUMENTS

| | | | |
|---|---|---|---|
| 1,459,026 | 6/1923 | Kocher | 475/203 |
| 1,678,447 | 7/1928 | Schwenke | 475/203 |
| 2,306,545 | 12/1942 | Kümmich | 475/203 |
| 2,796,942 | 6/1957 | Hill | 475/203 |
| 2,831,372 | 4/1958 | Boughner | 475/203 |
| 4,967,861 | 11/1990 | Oyama et al. | 475/198 |
| 5,135,444 | 8/1992 | Hattori | 475/285 |
| 5,311,789 | 5/1994 | Henzler et al. | 74/331 |

FOREIGN PATENT DOCUMENTS 605729  5/1978  U.S.S.R. ................................ 475/203

*Primary Examiner*—Charles A. Marmor
*Assistant Examiner*—Sherry Lynn Estremsky

[57] ABSTRACT

A transmission apparatus for a vehicle includes an input shaft and an output shaft. The input shaft receives power from an engine of the vehicle. One of three gear pairs having different gear ratios operationally connects the input shaft to the output shaft to transfer the engine power to the output shaft. Synchronizers are used to select which of the three gear pairs operationally connects the input and output shafts. The transmission apparatus also includes a differential for transferring power to wheels of the vehicle. One of two final gear pairs having different gear ratios operationally connect the output shaft to the differential. Another synchronizer is used to select which of the two final gear pairs operationally connects the output power shaft to the differential. In this manner, the transmission apparatus can provide six forward speeds, and through the provision of a reverse gear unit, the transmission apparatus can also provide two reverse speeds. Accordingly, the transmission apparatus is compact, light weight, and improves overall fuel efficiency and power performance.

8 Claims, 2 Drawing Sheets

TRANSMISSION APPARATUS CAPABLE OF BEING DRIVEN IN TWO REVERSE SPEEDS

BACKGROUND OF THE INVENTION

1. Field of the Invention

The present invention relates to a transmission apparatus for a vehicle capable of being driven in six forward speeds and in two reverse speeds.

2. Description of Related Art

Various types of transmission apparatuses for a vehicle are known in the art. Generally, a transmission is located between a clutch and the driving wheels for increasing or reducing revolution power of an engine according to a desired state of the vehicle. Specifically, the transmission transfers power to the driving wheels, or changes engine torque applied to the driving wheels based on driving conditions and the vehicle speed.

FIG. 1 illustrates a conventional transmission having five forward speeds and one reverse speed. This transmission includes a transmission case 10, an input power shaft 12 having a ballbearing 11, and an output power shaft 14 having a tapered bearing 13. The output power shaft 14 is positioned below and in parallel with the input shaft 12 within the case 10. The input power shaft 12 includes first, second, third, fourth, and fifth speed gears 15, 16, 17, 18 and 19. The first and second speed gears 15 and 16 are fixed to the input power shaft 12, while the third, fourth and fifth speed gears 17, 18 and 19 are movably mounted to the input power shaft 12 (i.e., free wheel on the input power shaft 12). Mounted between the first and second speed gears 15 and 16 is a reverse gear 20 which, like the first and second speed gears 15 and 16, is fixed to the input power shaft 12.

The output power shaft 14 includes a plurality of driving gears 23 disposed thereon. Each driving gear 23 corresponds to one of the first through fifth speed gears 15–19. As such, the driving gears 23 corresponding to the first and second speed gears 15 and 16 are movably mounted upon the output power shaft 14, while the driving gears 23 corresponding to the third, fourth and fifth speed gears 17, 18 and 19 are fixed to the output power shaft 14.

The input and output power shafts 12 and 14 also contain oil flow holes 12a and 14a disposed thereon for delivering oil stored in an oil tank to the speed and driving gears.

As further shown in FIG. 1, a first synchronizer 21 is disposed on the input power shaft 12 between the third and fourth speed gears 17 and 18. A second synchronizer 22 is also disposed on the input power shaft 12 at an outer side of the fifth speed gear 19. A third synchronizer 24 is disposed upon the output power shaft 14 between the driving gears 23 corresponding to the first and second speed gears 15 and 16. The first synchronizer 21 serves to engage and fix either the third or fourth gears 17 and 18 to the input power shaft 12. Similarly, the second synchronizer 22 serves to engage and fix the fifth speed gear 19 to the input power shaft 12. Also, the third synchronizer 24 serves to engage and fix one of the driving gears 23 corresponding to the first and second speed gears 15 and 16 to the output power shaft 14.

As further shown in FIG. 1, the third synchronizer 24 includes a gear member connected thereto which becomes operationally connected to reverse gear 20 by a secondary reverse gear attached to a fork rod (not shown).

The transmission apparatus illustrated in FIG. 1 is more correctly termed a transaxle since the transmission apparatus also includes a differential. A final gear 32 disposed on the output power shaft 14 is in a gearing relationship with a drive gear 25 of the differential. Besides the drive gear 25, the differential includes a differential case 27, ballbearings 26 disposed on both ends of the drive gear 25, and a pair of axles 29 symmetrically facing each other. Furthermore, the differential includes pinion gears 31 disposed between left and right side gears 28. The pinion gears 31 are fixed to a pinion shaft 30 forming a right angle with the side gears 28. As illustrated, the pinion gears 31 are in a gearing relationship with the side gears 28. The differential prevents the wheels connected thereto via the axles 29 from slipping during turning of the vehicle.

The conventional transmission apparatus illustrated in FIG. 1 operates as follows. When the driver pushes on the clutch pedal and operates a shift lever, a shift fork corresponding to the desired gear speed operates one of the first, second or third synchronizers 21, 22 and 24. Based on the operation of the synchronizers 21, 22 and 24, one of the movably mounted speed gears 17, 18 and 19 or the movably mounted driving gears 23 will become fixed to either the input power shaft 12 or the output power shaft 14. Accordingly, engine power will be transferred from the input power shaft 12 to the output power shaft 14, and then transferred via the final gear 32 to the differential. Finally, the power will be transferred from the differential to the driving wheels.

When the vehicle drives straight forward, the left and right side gears 28 fixed to the axle 29 rotate in the same direction. The pinion gears 31 rotatably fixed to the pinion shaft 30 then rotate in different directions with respect to each other. At this time, the differential effect does not exist.

When the vehicle turns, the left axle 29 containing the right side gear 28 rotates at a lower speed relative to the differenential case 27 than the right axle 29. Consequently, the right axle 29 creates a differential force for easily turning the vehicle.

When operating in the reverse direction, operation of the shift lever causes a secondary reverse gear (not shown) to become engaged with the reverse gear 20 and the corresponding gear member on the third synchronizer 24. This engagement causes the output power shaft 14 to rotate in an opposite direction to that of the input power shaft 12. Consequently, the driving wheels are driven in the reverse direction.

Such a conventional transmission apparatus is capable of only being driven in five forward speeds and one reverse speed. Additionally, these transmissions suffer from such problems as low fuel ratio or low power performance since the vehicle is driven after changing a certain speed in a certain area of the gear shift ratio. These conventional transmission apparatuses also suffer from low space efficiency since the transmissions have a large volume, are quite heavy, and are also long. Furthermore, the transmissions have a complicated structure, and are difficult, not to mention expensive, to manufacture.

SUMMARY OF THE INVENTION

Accordingly, it is an object of the present invention to provide an improved transmission apparatus which eliminates the above problems encountered with conventional transmission apparatuses.

Another object of the present invention is to provide an improved transmission apparatus for a vehicle which includes an improved differential such that the transmission is light weight and occupies a smaller space compared with conventional transmissions.

Still another object of the present invention is to provide an improved transmission apparatus which is simple in structure, inexpensive to manufacture, and durable.

These and other related objects are achieved by providing a transmission apparatus for a vehicle which includes an input shaft; an output shaft; at least first and second gear pairs for operationally connecting the input shaft to the output shaft, the first and second gear pairs having different gear ratios; first selecting means for selecting one of the first and second gear pairs to operationally connect the input shaft and the output shaft; a first and second final gear movably mounted on the output shaft for operationally connecting the output shaft with a differential of the vehicle, the first and second final gears providing different gear ratios between the output shaft and the differential; and second selecting means for selecting one of the first and second final gears to operationally connect the output shaft to the differential.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
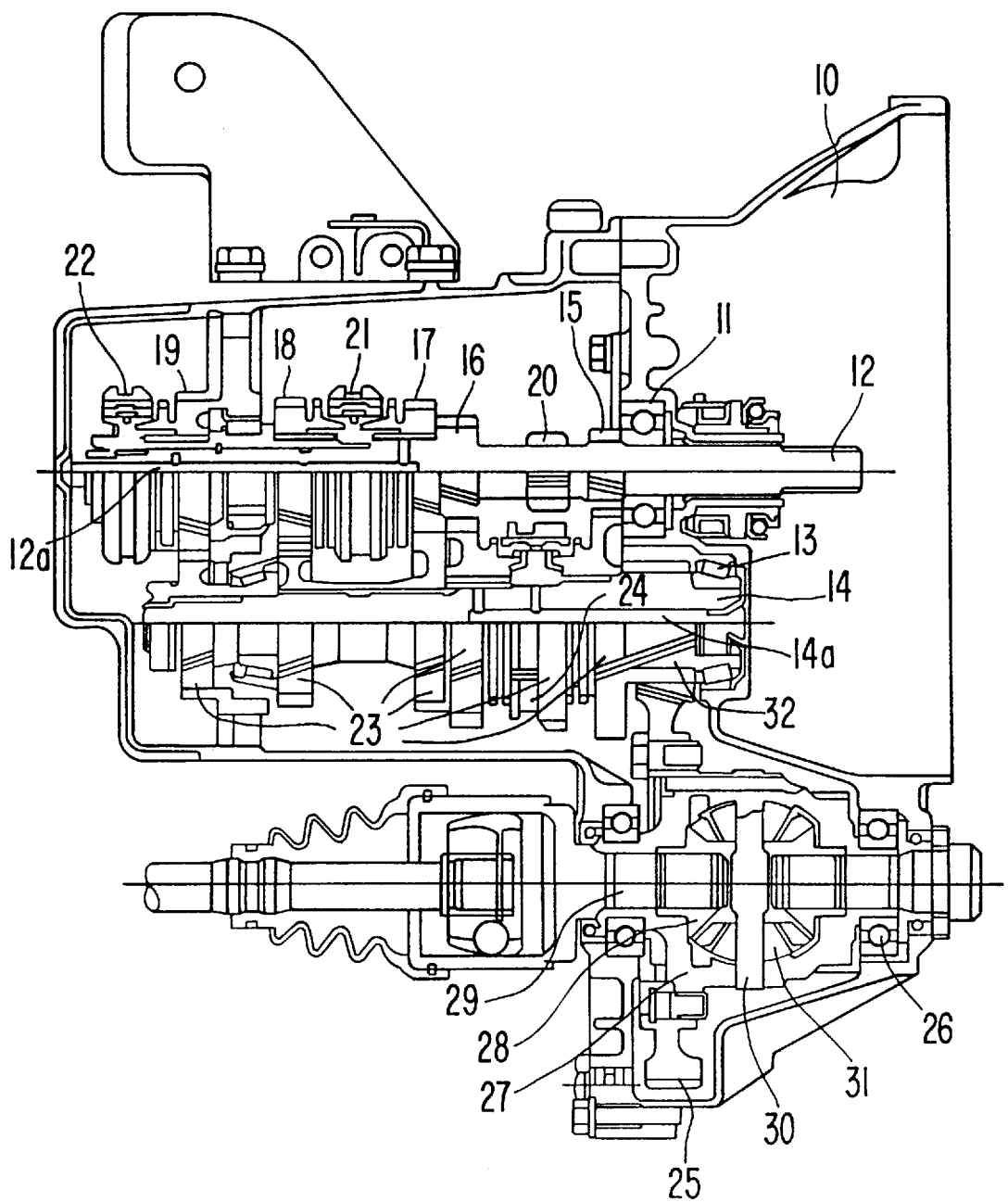
FIG. 1 is a partially diagrammatic sectional view of a conventional transmission apparatus for a vehicle.
Figure 2:
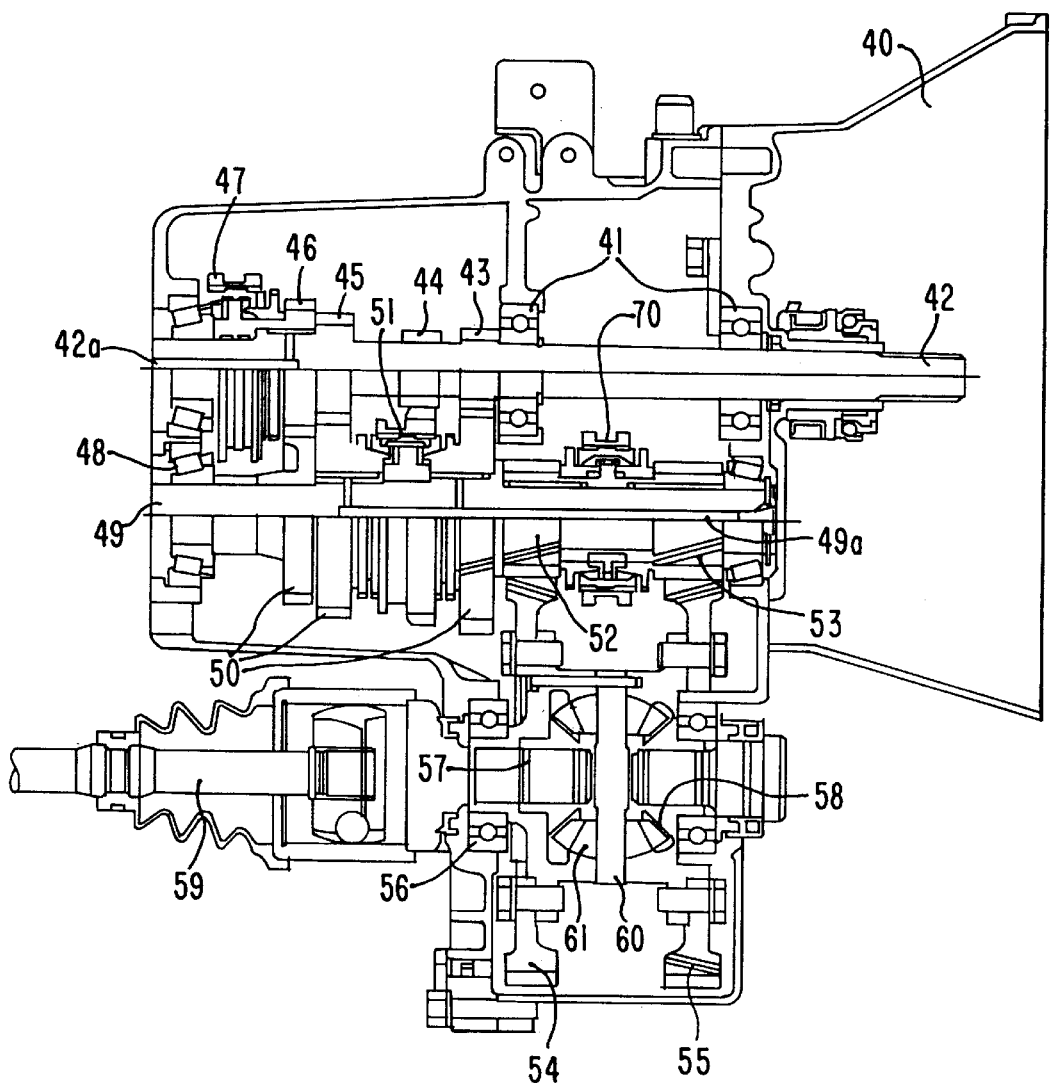
FIG. 2 is a partially diagrammatic sectional view of a transmission apparatus for a vehicle capable of being driven in six forward speeds and two reverse speeds according to the present invention.

Referring now in detail to the drawings for the purpose of illustrating preferred embodiments of the present invention, the transmission apparatus according to the present invention as shown in FIG. 2 will be described. As shown in FIG. 2, the transmission apparatus according to the present invention includes a housing 40, a first input power shaft 42, a pair of ballbearings 41 disposed on a center portion of the input power shaft 42, an output power shaft 49 parallel to input power shaft 42, and tapered bearings 48 supporting output power shaft 49. FIG. 2 further illustrates that the input power shaft 42 has a first speed gear 43, a reverse gear 44, a second speed gear 45, and a third speed gear 46 disposed thereon. The first speed gear 43, the reverse gear 44, and the second speed gear 45, are fixed to the input shaft 42. The third speed gear 46, however, is movably mounted on the input power shaft 42 (i.e., free wheels on the input power shaft 42).

The output power shaft 49 includes driving gears 50 corresponding to the first, second, and third speed gears 43, 45 and 46. The driving gears 50 corresponding to the first and second speed gears 43 and 45 are movably mounted to the output power shaft 49, while the driving gear 50 corresponding to the third speed gear 46 is fixed to the output power shaft 49. The input and output power shafts 42 and 49 also include an input oil flow hole 42a and an output oil flow hole 49a, respectively, for delivering oil supported by an oil tank to the speed gears and driving gears.

The transmission according to the present invention illustrated in FIG. 2 also includes a first synchronizer 47 disposed on the input power shaft 42 at the outside of the third speed gear 46. Furthermore, the output power shaft 49 includes a second synchronizer 51 disposed between the driving gears 50 corresponding to the first and second speed gears 43 and 45. The first synchronizer 47 serves to engage and fix the third speed gear 46 to the input power shaft 42. The second synchronizer 51 serves to engage and fix one of the driving gears 50 corresponding to the first and second speed gears 43 and 45 to the output power shaft 49.

As further illustrated in FIG. 2, the output power shaft also includes first and second final gears 52 and 53 movably mounted thereon. The first final gear 52 has a smaller gear ratio than the second final gear 53. Furthermore, each of the first and second final gears 52 and 53 is in a gearing relationship with a first and second drive gears 54 and 55, respectively, of the differential. Disposed between the first and second final gears 52 and 53 is a third synchronizer 70. The third synchronizer 70 serves to engage and fix one of the first and second final gears 52 and 53 to the output power shaft 49.

Besides the first and second drive gears 54 and 55, the differential also includes a differential case 57 having ball bearings 56 disposed on both ends thereof. In the differential case 57, there are a pair of axles 59 facing each other and having a side gears 58 connected thereto. The side gears 58 are in a gearing relationship with pinion gears 61 fixed to a pinion shaft 60 which is at a right angle to the side gears 58. The differential prevents the wheels connected thereto via axles 59 from slipping during turning of the vehicle.

Operation of the transmission according to the present invention as illustrated in FIG. 2 will now be described. When a driver operates a shift lever and a clutch to select a first, second, or third speed, shift forks operate the third synchronizer 70 to engage and fix the first final gear 52 to the output power shaft 49 (i.e. the final gear having the smaller gear ratio). Shift forks will then operate one of the first and second synchronizers 47 and 51 to engage the appropriate gear to achieve either first, second or third gear. Specifically, the second synchronizer 51 will engage the driving gear 50 corresponding to the first speed gear 43 in order to place the vehicle in first speed, the synchronizer 51 will engage the driving gear 50 corresponding to the second speed gear 45 to place the vehicle in the second speed, and the second synchronizer 47 will engage the third speed gear 46 to place the vehicle in third speed.

When, however, the driver selects either the fourth, fifth or sixth speeds, the shift forks connected to the shift lever operate the third synchronizer 70 such that the third synchronizer 70 engages the second final gear 53 (i.e., the final gear having the larger gear ratio). Since, as described above, the second final gear 33 has a higher gear ratio than the first final gear 52, switching from the first final gear 52 to the second final gear 53 changes the overall speed ratio of the transmission. Accordingly, once the synchronizer 70 fixes the second final gear 53 to the output power shaft 49, fourth, fifth, and sixth speeds can be achieved by operation of the first synchronizer 47 and the second synchronizer 51. Specifically, fourth speed is achieved by having the second synchronizer 51 engage the driving gear 50 corresponding to the first speed gear 43, fifth speed is achieved by having the synchronizer 51 engage the driving gear 50 corresponding to the second speed gear 45, and sixth speed is achieved by having the first synchronizer 47 engage the third speed gear 46.

Depending upon the desired speed gear, the power output from the engine will be transferred from the output power shaft 42 via one of the first, second, and third speed gears 43, 45 and 46 to one of the driving gears 50. Accordingly, the power of the engine will be transferred from the input power shaft 42 to the output power shaft 49. Then, this power will be transferred from the output power shaft 49 to the differential via one of the first and second final gears 52 and 53. From there, the power will be transferred from the differential to the driving wheels. In this manner, six forward driving speeds can be achieved by the present invention.

When the vehicle drives straight forward, the left and right side gears 58 fixed to the axles 59 rotate in the same direction. The pinion gears 61 rotatably fixed to the pinion shaft 60 then rotate in different directions with respect to each other. At this time, the differential effect does not exist.

When the vehicle turns the left axle 59 (containing the right side gear 58) rotates at a lower speed relative to the differential case 57 than the right axle 59. Consequently, the right axle 59 creates a differential force for easily turning the vehicle.

When reverse is selected, the shift lever moves a shift rod having a secondary reverse gear (not shown) attached thereto. The secondary reverse gear operatively connects the reverse gear 44 with the gear member attached to the second synchronizer 51. Accordingly, the output power shaft 49 will now rotate in the reverse direction with respect to the input power shaft 42. Depending upon which one of the first and second final gears 52 and 53 is engaged by the third synchronizer 70, either a first or second reverse speed can be achieved.

As discussed above, the transaxle according to the present invention provides six forward speeds and two reverse speeds. Accordingly, the driver has a wide range of running speeds from which to choose from. Furthermore, the transmission according to the present apparatus is light weight compared to conventional apparatuses, is lower in volume and length, and provides an improved fuel ratio and power performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim the following:

1. A transmission apparatus for a vehicle having wheels, comprising:
    an input shaft;
    an output shaft;
    at least first and second gear pairs for operationally connecting said input shaft to said output shaft, said first and second gear pairs having different gear ratios, respectively,
        wherein said first gear pair includes a first speed gear fixed to said input shaft and a first driving gear movably mounted on said output shaft and having a gearing relationship with said first speed gear, and
        wherein said second gear pair includes a second speed gear fixed to said input shaft and a second driving gear movably mounted on said output shaft and having a gearing relationship with said second speed gear;
    first selecting means for selecting one of said first and second gear pairs to operationally connect said input shaft and said output shaft, wherein said first selecting means comprises a driving gear synchronizer disposed on said output shaft between said first and second driving gears for selectively engaging and fixing one of said first and second driving gears to said output shaft;
    first and second final gears movably mounted on said output shaft; and
    second selecting means for selectively engaging and fixing one of said first and second final gears to said output shaft, wherein said second selecting means comprises a final gear synchronizer disposed on said output shaft between said first and second final gears.

2. The transmission apparatus of claim 1, further comprising:
    a differential constructed and arranged to transfer power to the wheels of the vehicle, and having first and second drive gears in a gearing relationship with said first and second final gears, respectively.

3. The transmission apparatus of claim 2, wherein said differential is constructed and arranged to prevent the wheels of the vehicle from slipping when the vehicle is turning.

4. The transmission apparatus of claim 1, further comprising:
    a third gear pair for operationally connecting said input shaft to said output shaft, said third gear pair having a different gear ratio than said first and second gear pairs; and wherein
    said first selecting means selects one of said first, second and third gear pairs to operationally connect said input shaft and said output shaft.

5. The transmission apparatus of claim 4, wherein said third gear pair includes a third speed gear movably mounted on said input shaft, and a third driving gear fixed to said output shaft and having a gearing relationship with said third speed gear.

6. The transmission apparatus of claim 5, wherein said first selecting means comprises:
    a driving gear synchronizer disposed on said output shaft between said first and second driving gears for selectively engaging and fixing one of said first and second driving gears to said output shaft; and
    a third gear synchronizer disposed on said input shaft adjacent to said third speed gear for selectively engaging and fixing said third speed gear to said input shaft.

7. The transmission apparatus of claim 4, further comprising:
    reverse gear means for operationally connecting said input shaft and said output shaft such that said output shaft rotates in the same direction as said input shaft.

8. The transmission apparatus of claim 1, further comprising:
    reverse gear means for operationally connecting said input shaft and said output shaft such that said output shaft rotates in the same direction as said input shaft.

* * * * *